United States Patent [19]
Lasoen

[11] 3,812,916
[45] May 28, 1974

[54] DRAFT SENSING UNIT FOR TRACTOR

[75] Inventor: Jean J. Lasoen, Villepreux, France

[73] Assignee: Massey-Ferguson Inc., Detroit, Mich.

[22] Filed: Nov. 22, 1971

[21] Appl. No.: 200,958

[52] U.S. Cl. .............................................. 172/7
[51] Int. Cl. ........................................ A01b 63/112
[58] Field of Search .................... 172/7–10, 239; 73/141 A, 144

[56] References Cited
UNITED STATES PATENTS

| | | | |
|---|---|---|---|
| 2,285,471 | 6/1942 | Sturgess | 73/144 |
| 2,319,299 | 5/1943 | Converse | 73/141 A |
| 2,940,530 | 6/1960 | DuShane | 173/7 |
| 2,946,392 | 7/1960 | Nelson | 172/7 |
| 3,422,906 | 1/1969 | Bunting et al. | 172/9 |
| 3,485,303 | 12/1969 | Gassman | 172/7 |

Primary Examiner—Stephen C. Pellegrino
Attorney, Agent, or Firm—George C. Bower

[57] ABSTRACT

A tractor linkage control has a draft load measuring device in the form of an elongated bar extending between two spaced supports on the tractor, the draft links are connected to the bar to cause the same to deflect under draft loads, measuring means are provided to measure the maximum angular deflection of the bar to provide a usable control signal over a large range of draft forces. The measuring means includes an elongated member clamped at one end to the bar at its point of maximum deflection and having its free end operable to move a cam member carried on the bar.

8 Claims, 8 Drawing Figures

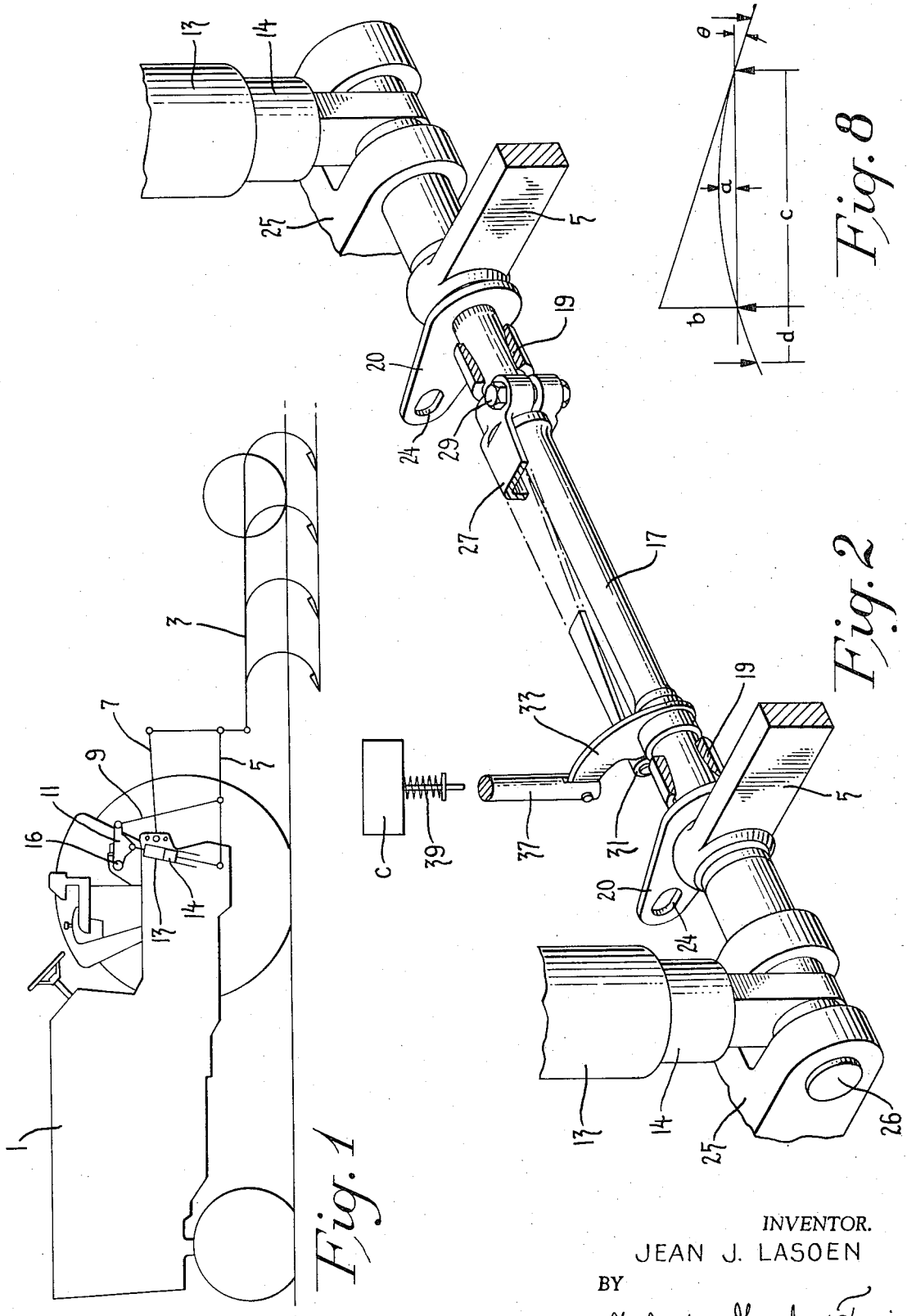

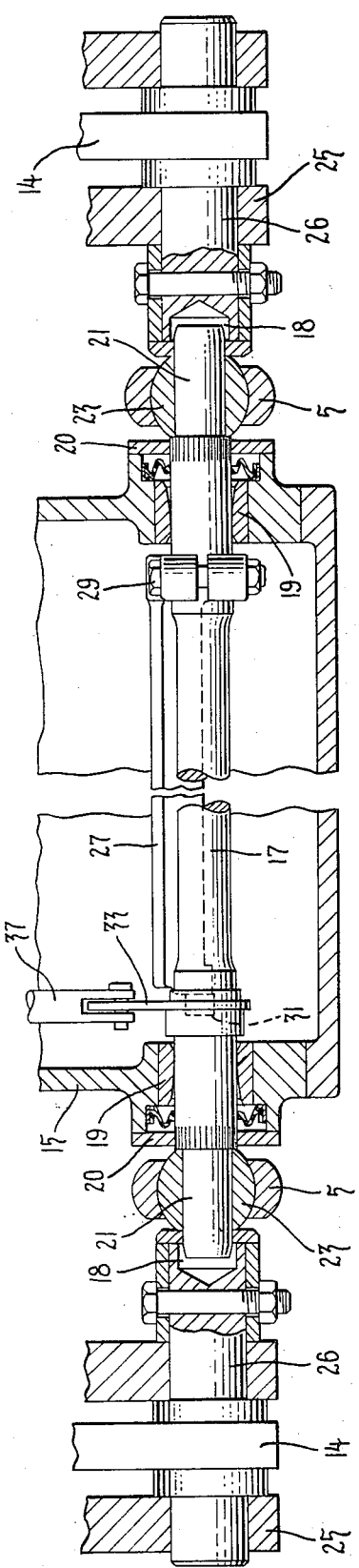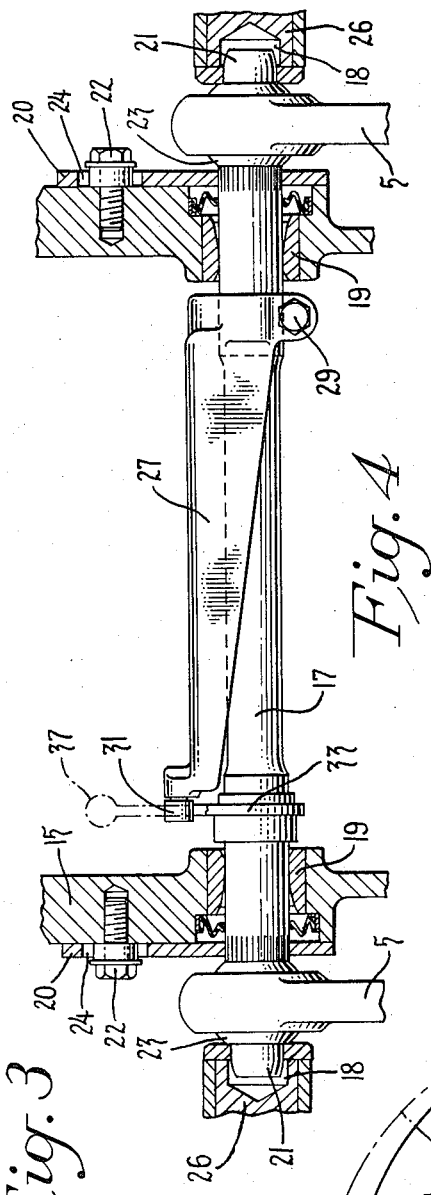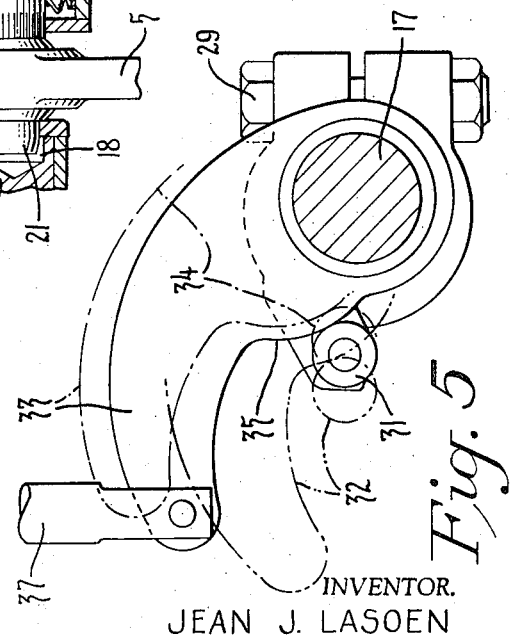

3,812,916

DRAFT SENSING UNIT FOR TRACTOR

This invention relates to tractors of the type equipped with a power elevatable implement hitch linkage and it is more particularly concerned with an improved draft sensing unit and control for the linkage.

Most tractors, particularly of the agricultural type, utilize a elevatable power three-point hitch for coupling the tractor to implements behind the tractor. There generally is a draft sensing means which measures the draft load between the implement and the tractor and acts through the control system to raise or lower the linkage and the implement so as to maintain a constant draft load.

The actual draft forces in a large tractor may range from over 15,000 pounds in one direction to 6,000 in the opposite direction. This is an overall range therefore of 21,000 pounds. In order to maintain both accuracy and usuable sensitivity of a draft measuring device over such a large range of forces, it is necessary to have a relatively large force measuring sensor such as a heavy spring, to minimize the actual movement of the linkage in its operation on the draft sensing unit itself. Thus, in the case of a large tractor it is desirable to have a spring having a very low deflection rate or one that will have a rather small deflection for a large draft force. This makes it difficult to provide a control over the full range of the draft forces. It would therefore be desirable to provide a draft sensing system wherein a spring having a suitable deflection rate could be utilized but which would produce an output signal that would be sensitive to very small changes in draft forces.

It is therefore an object of the invention to provide a draft measuring system which utilizes a spring in the form of a bar and which is deflected by the draft forces on the linkage. Means are provided for measuring relatively small changes in loads by measuring the changes in the slope or the deflection angle of the bar.

It is a further object of the invention to provide a draft sensing arrangement for a tractor in which the draft forces are measured by applying the same to a resilient bar and by measuring the angular deflection of the bar near a point of maximum angular deflection. By comparing this angle with the no loaded position of the bar it is possible to provide a force measuring device having a good range of sensitivity over a very large range of forces.

These and other objects and advantages will be apparent from the following specification and attached drawings in which:

FIG. 1 is an outline of a tractor and hitch and implement combination on which the invention can be applied;

FIG. 2 is a perspective view of the draft sensing linkage;

FIG. 3 is a cross-sectional view showing the draft sensing member and the connection of the draft links thereto;

FIG. 4 is a sectional view also showing the draft sensing unit and the means for measuring and the selection thereof;

FIG. 5 is an enlarged view showing details of the deflection measuring hitch;

FIG. 6 is a diagrammatic showing of the draft sensing unit in zero load condition;

FIG. 7 is a diagrammatic showing of the draft sensing unit in load condition; and FIG. 8 illustrates the difference between the change in slope and the deflection of a loaded beam.

Referring now to the drawings:

FIG. 1 shows a tractor 1 coupled by a hitch to an implement 3. The hitch includes a pair of lower links 5, only one of which is shown, and a top link 7. The links 5 and 7 together comprise conventional three-point hitch. The lower links 5 are raised by lift links 9 connected to a lift arm 11 secured to a rockshaft 16. The arm 11 is raised by means of a piston 14 operating in a cylinder 13.

In FIGS. 2, 3 and 4, the lower links 5 are shown supported on the ends of a shaft or bar 17 which is, in turn, supported by bearings 19 within a housing 15. Shaft 17 has reduced end portions 21 which receive ball joints 23 on the lower links 5. The tractor includes a fork support member 25 on each side thereof within which is located the lower ends of the piston rods 14. The rod 14 is carried on a short stub shaft 26. The reduced ends 21 on the cross shaft 17 are loosely received within depressions 18 in the end of the stub shaft 26, and can move freely therein.

A pair of links 20 are splined on the shaft 17 and are attached by bolts 22 to the housing 15. The bolts pass through slots 24 in the links and the slots permit fore and aft movement of the shaft due to the draft forces but prevent rotation of the shaft 17. As seen in FIGS. 3 and 4, the reduced ends 21 are free to move within a limited range in the depressions 18 in the ends of stub shafts 26. Maximum bending of the shaft 17 in either direction will cause the ends 21 to engage the edges of the holes in shafts 26 to act as a stop limiting further bending of the shaft 17.

An elongated member 27, which has a L-shaped cross section, is clamped onto the shaft or bar 17 adjacent to the right hand support as viewed in the figures. A bolt 29 acts to tighten the clamp on the shaft. The opposite end of the elongated member 27 carries a roller 31 that engages a cam member 33 rotatably carried on the shaft 17. As seen in FIG. 5, the cam member 33 has a cam surface 35 engaged by the roller 31 to cause the cam member 33 to be rotated about its axis coincident with the axis of the shaft 17. The arm 33 is pivotally connected at its outer end to the lower end of a link rod 37 which transmits motion of the arm 3 to a control mechanism C. A spring 39 acts between a stationary portion on the tractor and the rod 37 to urge it downwardly and thereby cause the cam member 33 to bear against the roller 31. These members convert the amplified slope measurement of the elongated member into a control signal.

The control C, details of which form no part of the invention, may be of any suitable form which includes valve means that will cause the cylinder 13-14 to be actuated to raise and lower the links in accordance with the draft loads on the links and changes therein.

When the tractor is pulling an implement, there are tension or pulling forces in the lower links 5. These forces act on the reduced ends 21 of the shaft 17 to bend the shaft as shown diagrammatically in FIG. 7. FIG. 6 shows the shaft in an unstressed or zero draft load condition. As the shaft 17 bends the clamp end of the member 27 remains parallel to the shaft at the point of clamping. Since the other end of the member 26 is free of draft forces, the member 27 remains straight.

The movement of the free end of the member 27 relative to the shaft 17 adjacent to the free end, is a function of the angle of deflection or slope of the curve that the shaft takes.

FIG. 8 shows, by exaggeration, the difference between the deflection $a$ of the shaft 17 at its maximum point of deflection and distance $b$ reflecting the change in slope of the shaft at its point of maximum angle change. It can be shown that the value of distance $b$ is at least four times the value of distance $a$ for small deflections of the shaft and greater than four times as the deflection increases. For small deflections the ratio is $b/a = 4(c + d)/c$, when $a$ is the maximum deflection of the shaft, $b$ is the distance that a line tangent to the shaft at the fulcrum point lies from the opposite fulcrum point, $c$ is the distance between the fulcrum points 19 and $d$ is the distance from the load point (connection of lower link 5) to the fulcrum 19. It can be seen the means for measuring the movement of the free end is a function of the angle suspended the bar the elongated member.

When the effect of the weight of the implement supported by the tractor linkage is greater than the effect of the draft forces between the implement and tractor, there will be a compression force on the links 5 and the shaft 17 will bend in the opposite direction. The free end of member 27 will then be closer to the shaft than when the shaft is in unstressed condition. FIG. 5 illustrates in solid lines, the no load condition and in dot and dashed lines the extreme position of the cam member 33 when in maximum compression and maximum tension. The dashed lines 32 indicate the maximum compression (high draft) position and the dashed lines 34 the maximum tension position.

The embodiment shown is merely an example of one way of measuring the slope or angle of the bar 17. Other means could be utilized for sensing the angle change and these are deemed to be within the scope of the invention. Furthermore, the invention could be applied to tractors wherein the forces in the top link were measured to control the linkage to maintain any predetermined draft load.

I claim:

1. A tractor draft control apparatus having spaced fulcrum supports, an elongated bar mounted on the spaced fulcrum supports, a draft means connected to the bar for applying draft forces transversely to the bar for bending the bar between the supports in response to varying draft loads, hydraulic control means including valve means controlling the draft means in accordance with changes in draft loads, sensing means coupled to said valve means for controlling the valve means on changes in deflection of the bar, characterized by said sensing means having an elongated member affixed at one end to the bar at a location where the slope of the bar changes on bending and the other end of said member being movable to amplify the changes in slope of the bar at the affixed end and means being associated with the movable end to convert the amplified change in slope into a control signal for operating said valve means.

2. The tractor draft control apparatus of claim 1 wherein said fulcrum support and the attachment of said elongated member is adjacent to said support and said draft means has a link rotatably attached to said bar on the opposite side of said support from the attachment.

3. The tractor draft control apparatus of claim 1 further characterized by draft means having two spaced draft links being connected to said bar to cause bending deflection thereof.

4. The tractor draft control apparatus of claim 1 wherein said elongated member is affixed to said bar where maximum measurable slope changes occur.

5. The tractor draft control apparatus of claim 4 wherein said elongated member extends generally parallel along the bar and said sensing means includes means for measuring the movement of said movable end which is a function of and varying as the included angle between the bar and the elongated member.

6. The tractor draft control apparatus of claim 5 wherein said sensing means comprises a first cam member rotatably carried on the bar and a cam operating member carried on the other end of the elongated member and engaging the first cam member to cause it to rotate on said bar with relative movement between the cam members.

7. The tractor draft control apparatus of claim 6 wherein the cam operating member on the end of the elongated member comprises a roller in contact with the first cam member and biasing means to urge said first cam member against the roller.

8. The tractor draft control apparatus of claim 6 wherein the elongated member is connected to the bar by clamping means.

* * * * *